(12) United States Patent
Carey

(10) Patent No.: US 6,455,483 B1
(45) Date of Patent: Sep. 24, 2002

(54) WELL STIMULATION AND FORMATION PURGING COMPOSITION

(76) Inventor: Charles C. Carey, P.O. Box 178, Homer, LA (US) 71040

( * ) Notice: Subject to any disclaimer, the term of this patent is extended or adjusted under 35 U.S.C. 154(b) by 122 days.

(21) Appl. No.: 09/658,724

(22) Filed: Sep. 11, 2000

Related U.S. Application Data

(63) Continuation-in-part of application No. 09/537,897, filed on Mar. 28, 2000, now Pat. No. 6,143,709.

(51) Int. Cl.[7] ............................................... C11D 17/00
(52) U.S. Cl. ........................ 510/247; 510/245; 510/261; 510/269; 510/584; 166/170
(58) Field of Search ................................ 510/245, 247, 510/269, 261, 504, 259; 166/170

(56) References Cited

U.S. PATENT DOCUMENTS

| | | | |
|---|---|---|---|
| 5,562,866 A | 10/1996 | Hu et al. | 510/432 |
| 5,587,356 A | 12/1996 | Dauderman | 510/320 |
| 5,679,877 A | 10/1997 | Erilli | 510/218 |
| 5,705,467 A | 1/1998 | Choy | 510/370 |
| 5,707,955 A | 1/1998 | Gomes | 510/421 |
| 5,728,654 A | 3/1998 | Dobson, Jr. | 507/272 |
| 5,767,050 A | 6/1998 | Adamy | 510/235 |

*Primary Examiner*—Necholus Ogden
(74) *Attorney, Agent, or Firm*—R. Keith Harrison

(57) ABSTRACT

A well stimulation and purging composition which is typically used in well cleanup, well stimulation and formation purging applications for enhancing oil and gas production. The composition is a cationic surfactant characterized by a homogenous aqueous solution of a coco diamine amido benzyl chloride type quaternary compound, phosphate chelator/ester, isopropanol anhydrous, ammonium bisulfide, and potassium chloride or a clay stabilizer formulation, and aids in extracting water and condensate from wells and dissipates, disperses and retards bacterial growth and buildup of iron sulfide, iron oxide, calcium and salt. The composition is applied to the wells in order to clear the water and condensate and significantly enhance total well production by chelating minerals such as salt, iron and calcium; retarding bacterial growth; and flocculating and foaming the water, condensate and solids from the well.

6 Claims, No Drawings

WELL STIMULATION AND FORMATION PURGING COMPOSITION

CROSS REFERENCE TO RELATED APPLICATIONS

This application is a continuation-in-part of Application Ser. No. 09/537,897, filed Mar. 28, 2000. U.S. Pat. No. 6,143,709.

BACKGROUND OF THE INVENTION

1. Field of the Invention

This invention relates to techniques for cleaning, stimulating, purging and unloading fluids from gas and oil wells and more particularly, to a well stimulation and purging composition for enhancing gas and oil production in gas- and condensate-type wells by dissolving solids such as salt, drilling mud, iron sulfide, iron oxide and other mineral deposits, and chelating the minerals; retarding bacterial growth and dispersing bacteria; and flocculating and foaming the solids, minerals, bacteria and well fluids from the well. This cleansing action of the composition enhances production by reducing or eliminating hydrostatic back pressure in the wells. The composition is a cationic surfactant which is "ambiguous", or can emulsify both water and hydrocarbons in solution, and is characterized by a homogenous solution of a coco diamine amido benzyl chloride type quaternary compound, isopropanol anhydrous, ammonium bisulfide, phosphate chelator/ester and potassium chloride or a clay stabilizer formulation for use in extracting water and condensate from gas or oil wells. The quantity of solution to be applied to the well typically depends on well conditions such as well production and general well history.

In the oil and gas industry, wells which have been operable for many years in the production of oil and gas frequently decrease in productivity due to a number of factors. One of the most common impediments to well productivity is water coning, which occurs when water, frequently in the form of aqueous brines, flows from the well formation and into the well casing annulus in a process called water coning or water logging. This phenomenon causes a hydrostatic load which subsequently reduces the ability of the well to produce fluids and gas to the well surface. Consequently, the water must be drawn from the well and separated from the oil or gas, and this increases the cost of oil or gas production from the well. The presence of water coning in the well further impedes oil or gas production by forming salt and other mineral deposits in the well. While a variety of techniques have been used for removing fluids from the well the salt and other minerals typically remain in the form of deposits which partially or completely block the well such that deposits of these minerals impede the production of oil and gas from the well after removal of the water and condensate.

2. Description of the Prior Art

Various compositions having surfactant, emulsifying or cleansing properties are known in the art. Typical of these compositions is the "Formulated Branched Chain Alcohol Ether Sulfate Compounds" described in U.S. Pat. No. 5,562,866, dated Oct. 8, 1996, dated Oct. 8, 1996, to Patrick C. Hu, et al. The compounds are characterized by double-tailed alcohol ether sulfates of specified chemical structures which are formulated with a hydrotrope or a co-surfactant. The formulations are useful for various surfactant utilities including use in hard water systems. A "Thickened, Highly Aqueous, Cost Effective Liquid Detergent Compositions" is detailed in U.S. Pat. No. 5,587,356, dated Dec. 24, 1996, to Shelley L. Dauderman, et al. The compositions are characterized by low-cost, effective aqueous heavy duty liquid laundry detergent compositions. The compositions contain relatively low levels of an anionic/nonionic-based surfactant system with a protease-containing enzyme component, a low-cost viscosity-enhancing agent and relatively large amounts of water. The anionic component of the surfactant system includes a combination of alkyl sulfate and alkyl ether sulfate. The nonionic component of the surfactant system includes fatty alcohol ethoxylates. U.S. Pat. No. 5,679,877, dated Oct. 21, 1997, to Rita Erilli, et al., discloses a "Thickened Liquid Cleaning Composition Containing an Abrasive". The composition includes a paraffin sulfonate, an ethoxylated alkyl ether sulfate, and optionally, a zwitterionic betaine surfactant, a Laponite day thickener and water. U.S. Pat. No. 5,705,467, dated Jan. 6, 1998, to Clement K. Choy, describes "Thickened Aqueous Cleaning Compositions and Methods of Use", characterized by a thickening agent including an alkyl ether sulfate surfactant which forms about 0.1 to about 10% by weight of the composition, about 0.1–5.0% by weight of a cothickening surfactant including an alkali metal fatty acid sulfate and/or an alkoxylated alkylphenol sulfate salt, a solvent selected from the class consisting of terpene derivatives including a functional group and tertiary alcohols which form about 0.01 to about 10% by weight of the composition, and an electrolyte component in an amount effective for enhancing thickening effects of the alkyl ether sulfate surfactant and solvent. A "High Foaming Nonionic Surfactant Based Liquid Detergent" is disclosed in U.S. Pat. No. 5,707,955, dated Jan. 13, 1998, to Gilbert S. Gomes, et al. The detergent is characterized by a disenfecting agent, four essential surfactants including a water-soluble nonionic surfactant, an ethoxylated alkyl ether sulfate anionic surfactant, two sulfonate surfactants, and water. U.S. Pat. No. 5,728,654, dated Mar. 17, 1998, to James W. Dobson, Jr., et al., discloses "Stabilized Fluids Containing Soluble Zinc", characterized by low solids, high density fluids which are useful as drilling, workover, and completion fluids and the like in oil and gas well operations. The fluids include a brine having dissolved therein a zinc salt such as zinc bromide, and optionally one or more additional water soluble salts, a viscosifier which is a high surface area silica, a biopolymer viscosifier, a fluid loss control additive which is preferably a starch derivative, zinc carbonate, and optionally, an alkaline buffer, a polar additive and a bridging agent. U.S. Pat. No. 5,767,050, dated Jun. 16, 1998, to Steven Adamy, details "Light Duty Liquid Cleansing Compositions Comprising Partially Esterified Polyhydric Alcohol Solubilizing Agent". The compositions include a biodegradable solubilizing agent, a water soluble, foaming, ethoxylated alkyl ether sulfate anionic surfactant, and optionally, a nonionic surfactant and a water soluble, foaming zwitterionic betaine surfactant. My application Ser. No. 09/537,897, filed Mar. 28, 2000, describes "Well Stimulation and Formation Purging Compositions", characterized by two base solutions which are typically used in combination with one another in well cleanup, well stimulation and formation purging compositions. The first base solution is an anionic surfactant characterized by an aqueous solution of ether sulfide, isopropanol anhydrous, ammonium bisulfide, and either potassium chloride or a clay stabilizer formulation. The second base solution is a cationic surfactant characterized by a homogenous aqueous solution of a coco dimine amido benzyl chloride type quaternary compound, isopropanol anhydrous, ammonium bisulfide, and potassium chloride or a clay stabilizer formulation.

An object of this invention is to provide well stimulation and purging/squeezing compositions for enhancing gas or oil production in gas and condensate type wells.

Another object of this invention is to provide well stimulation and purging compositions which are capable of batch treatment or continuous injection of oil and gas wells to facilitate removal of fluids, bacteria and various solids, salt and other mineral deposits from the wells, or purging of fluids from the well formations in order to reduce or eliminate fluid coning in the wells.

Still another object of this invention is to provide a well stimulating and purging composition characterized by a cationic, soluble surfactant foamer which is "ambiguous", or capable of emulsifying both oil and water, in well fluids, and is characterized by a homogenous solution of a coco diamine amido benzyl chloride type quaternary compound, isopropanol anhydrous, ammonium bisulfide, phosphate chelator/ester and potassium chloride or a clay stabilizer formulation, which composition is used primarily for extracting water and condensate from oil and gas wells.

A still further object of this invention is to provide a new and improved method of enhancing oil and gas production by cleaning, stimulating or purging oil and gas wells using a cationic surfactant characterized by a homogenous aqueous solution of a coco diamine amido benzyl chloride type quaternary compound, phosphate chelator/ester, isopropanol anhydrous, ammonium bisulfide, and potassium chloride or a clay stabilizer formulation.

SUMMARY OF THE INVENTION

These and other objects of the invention are provided in a well stimulation and purging composition for enhancing oil or gas production. The composition can be used either alone or in combination with selected additives in well cleanup, well stimulation or formation purging applications. The composition, a soluble cationic surfactant which is "ambiguous", or capable of emulsifying both oil and water in well fluids, is characterized by a substantially homogenous aqueous solution of a coco diamine amido benzyl chloride type quaternary compound, isopropanol anhydrous, potassium chloride, ammonium bisulfide, phosphate chelator/ester and potassium chloride or clay stabilizer formulation, and is used primarily for extracting water and condensate from gas and oil wells. Depending on well conditions, the composition is typically applied to the well to substantially eliminate water and bacteria, solids, salt and other mineral deposits, as well as condensate, from the well and substantially enhance oil or gas production from the well by decreasing hydrostatic back pressure in the well.

DESCRIPTION OF THE PREFERRED EMBODIMENTS

In a preferred embodiment, the well purging and stimulating composition of this invention is characterized by an aqueous solution which is typically used to facilitate cleaning of gas and oil wells through the cleaning and hydration of the hydrocarbon formation, "rat hole" and well bore in well cleanup, well stimulation and formation purging applications in gas and oil wells. The solution is a cationic surfactant characterized by a homogenous solution of coco diamine amido benzyl chloride type quaternary compound, isopropanol anhydrous, potassium chloride, phosphate ester and ammonium bisulfide. A small quantity of TADCO (trademark) Alpha Blue or the like dye can be added to the solution to facilitate visual monitoring of solution levels in pump trucks during application. The coco diamine amido benzyl chloride type quaternary compound, such as that having chemical formula $C_{12}H_{25}{}^+(CH_3)_3Cl^{31}$ and obtained from Select Industries, Inc., of Wichita Falls, Tex., is an oil emulsifier, surfactant and foaming agent, and the solution is capable of emulsifying both hydrocarbons and water in solution. The solution is typically prepared in 300 gallon batches, by initially placing about 2050 lbs. of water in a mixing vat and heating the water to about 40° C. As the water is circulated in the vat, about 352 lbs. of the coco diamine amido benzyl chloride type quaternary compound $[C_{12}H_{25}+(CH_3)_3Cl^-]$, about 72 lbs. isopropanol anhydrous $[(CH_3)_2,CHOH]$, about 39 lbs. of potassium chloride (KCl), about 90 lbs. of ammonium bisulfide (HSNS) and about 130 lbs. of phosphate ester (PO) is added to the heated water. In another embodiment, about a quart of a selected liquid clay stabilizer formulation well-known to those skilled in the art can be mixed instead of the potassium chloride in the solution. The heated mixture is circulated for about 30 minutes to achieve a substantially homogenous solution, which is typically stored in multiple 55-gallon drums or in 300 gallon POLY-CORR (trademark) tanks.

The well stimulation and purging composition of this invention can be used in batch treatment of gas and oil wells to remove water and condensate from the wells, dissolve and remove salt, solids and mineral deposits from the wells and remove and retard growth of bacteria in the wells, thereby significantly enhancing gas or oil production from the wells. The solution emulsifies and foams the water and condensate and retards further growth of bacteria in the well and disperses the existing bacteria to the well surface. Under circumstances in which batching of the solution is inadequate for clearing the bacteria, minerals and other solids, water and condensate from the oil or gas well, continuous injection of the solution into the well can be used for the purpose. In still another application the composition can be used to purge water, condensate, dissolved salts and minerals and other solids from the well to eliminate or substantially reduce water and condensate coning in the well. Accordingly, in purging applications the well is typically initially preflushed with about 15 barrels of flush water, followed by application of the composition, which can be slipstreamed, spearheaded or padded in conjunction with the flush water. The flush water is typically characterized by an aqueous solution of 2% potassium chloride and 0.05% clay stabilizer. Alternatively, the flush water can be made using 1 quart of a selected liquid clay stabilizer formulation per about 7 barrels of aqueous solution.

In typical batch treatment of packerless completion gas and oil wells, about 25 gallons of the solution is initially applied from a pump truck directly into the casing annulus. Under circumstances in which a packer is interposed between the well casing and tubing string of the well, the solution is applied to the annulus through the tubing string. After delivery of the composition solution into the well the master valve or wing valve of the well is repeatedly opened and closed, or "rocked". This action induces rapid pressure changes in the well which cause the solution to mix and foam with the water, hydrocarbons, solids and minerals. Additional composition is added to the well and the agitation process is repeated, as required until the well fluid foams upwardly through the casing annulus in the case of packerless completion wells, or through the tubing string in packered completion wells. The water, iron, minerals, bacteria and other solids, and salt in the casing, in addition to the oil condensate, are foamed to the well surface with the composition and the effluent is typically collected in a suitable collection facility. The various hydrocarbons are separated from the water and composition in the effluent by means of conventional separation techniques. Accordingly, the well annulus and "rathole" are substantially cleared of condensate and water and iron, bacteria, solids and salt and other mineral deposits, and this cleansing action significantly enhances gas or oil production from the well by reducing or eliminating hydrostatic back pressure in the well. The water, solids, mineral deposits and condensate are mixed and foamed together to the well surface and collected in collection tanks.

In typical continuous injection of packerless completion gas and oil wells, the solution is continuously injected from a holding tank directly into the well casing annulus, typically at a rate of about 4–8 gallons of solution per day, depending on well production. In packered completion gas and oil wells, the solution is delivered to the casing annulus through a conventional packer injector sleeve, well tubing, coiled tubing or capillary tubing which extends downwardly toward the perforations. The injected composition solution mixes and flocculates and foams with the water and mineral deposits and condensate in the well. The resulting effluent is produced to the well surface through the tubing and collected in a suitable collection facility, and the hydrocarbons are separated from the effluent. Injection of the solution is continued until gas or oil production from the well stabilizes, and then the volume of injected solutions is reduced accordingly until maximal gas or oil flow is achieved.

In typical purging application of the composition, the gas or oil well is initially preflushed with about 15 barrels of the flush water, which is applied to the well either directly into the casing annulus in the case of packerless completion wells, or through the tubing in the case of packered completion wells. Depending on well conditions, typically about 25 gallons of the solution is applied to the casing annulus or tubing by slipstreaming, spearheading or padding in conjunction with the flush water. A larger or smaller volume of the solution can be used, as needed, depending on the degree of mineral or sold blockage or condensate hindrance to production. The well is typically "shut-in" for approximately 24–48 hours in an attempt to achieve normal well shut-in pressures. Then, if needed, the well is "rocked" by repeatedly opening and closing the master valve or the wing valve of the well as heretofore described, to cause the composition solution to foam and mix with the water in the annulus and "rathole" and in the hydrocarbon formation, as well as with the solids, minerals and condensate in the water. The flocculating and foaming composition mixture draws the formation water, solids and minerals, as well as the condensate, from the formation through the hydrocarbon perforations in the casing, and foams upwardly through the casing annulus or tubing to the well surface, where the effluent is collected. Accordingly, the formation and casing annulus are substantially freed of water, solid and mineral blockage and condensate, thus reducing or eliminating hydrostatic back pressures to free gas flow and substantially preventing or reducing water coning in the casing annulus during subsequent production from the well. In cases of extreme blockage of the well bore due to calcium or other mineral deposits, sulfamic acid is typically "slip-streamed" into the well with the flush water at a rate of about 100 lbs. of sulfamic acid per 10 barrels of flush water. The entire sulfamic acid, flush water and composition mixture is allowed to soak in the well typically for about 48 hours before "rocking" of the well as described above.

The invention will be better understood by consideration of the following examples:

EXAMPLE 1

A 300 gallon batch of the composition solution was prepared by initially placing into a blending vat about 2050 lbs. of tap water, and the water was circulated in the vat and heated to about 40° C. To the water was added about 352 lbs. of a coco dimine amido benzyl chloride type quaternary compound [$C_{12}H_{25}^{+}(CH_3)_3Cl^{31}$], purchased from Select Industries, Inc., of Wichita Falls, Tex.; about 72 lbs. of isopropanol anhydrous (IPA); about 39 lbs. of potassium chloride; about 90 lbs. of ammonium bisulfide; about 130 lbs. of phosphate ester (PO); and about 5 oz. of TADCO (trademark) Alpha Blue dye, respectively. The heated water was circulated in the vat for about 30 minutes to achieve a substantially homogenous solution, and the solution was removed from the vat and stored in multiple 55-gallon drums.

EXAMPLE 2

A 300 gallon batch of the composition solution was prepared by initially placing into a blending vat about 2050 lbs. of tap water, and the water was circulated in the vat and heated to about 40° C. To the water was added about 352 lbs. of a coco diamine amido benzyl chloride type quaternary compound [$C_{12}H_{25}^{+}(CH_3)_3Cl^{-}$], purchased from Select Industries, Inc., of Wichita Falls, Tex.; about 72 lbs. of isopropanol anhydrous (IPA); about a quart of liquid clay stabilizer formulation; about 90 lbs. of ammonium bisulfide; about 130 lbs. of phosphate ester (PO); and about 5 oz. of TADCO (trademark) Alpha Blue dye, respectively. The heated water was circulated in the vat for about 30 minutes to achieve a substantially homogenous solution, and the solution was removed from the vat and stored in multiple 55-gallon drums.

EXAMPLE 3

About 7 barrels of flush water was prepared by initially placing about 7 barrels (294 gallons) of tap water in a mixing vat. About 1 quart of liquid clay stabilizer formulation was added to the water and mixed in the vat for about 30 minutes to achieve a substantially homogenous solution. The flush water was removed from the mixing vat and stored in multiple 55-gallon drums.

EXAMPLE 4

About 7 barrels (294 gallons) of flush water was prepared by initially placing about 7 barrels (294 gallons) of tap water into a mixing vat. A sufficient quantity of potassium chloride and clay stabilizer was added to the tap water to achieve a concentration of about 2% potassium chloride and about 0.05% clay stabilizer, and the water was mixed in the vat for about 30 minutes to achieve a substantially homogenous flush water solution. The flush water was removed from the mixing vat and stored in multiple 55-gallon drums.

EXAMPLE 5

Batch Treatment

About 30 gallons of the composition solution was injected from a pump truck into the casing annulus of a packerless completion gas well, gas production from which was hindered by water, iron, solids and salt deposits and condensate in the casing. The solution was agitated and formed a foaming mixture with the water, iron and salt in the well, and formed a foaming mixture with the condensate in the well. The solution foamed the water, iron, salt and condensate upwardly through the casing annulus, where the flocculating and foaming effluent was collected in collection tanks. The extracted hydrocarbons (water and oil) were separated by means of conventional separation techniques. Production from the well was considerably enhanced.

EXAMPLE 6

Batch Treatment

About 30 gallons of the composition solution was injected from a pump truck into tubing extending through the casing of a packered completion well, gas production from which was hindered primarily by water and iron and salt deposits in the well. The master valve of the well was repeatedly opened and closed for about 20 minutes. As the solution was thusly agitated in the well, the solution formed a foaming mixture with the water, iron and salt in the well. The solution flocculated and foamed the water, iron, salt and condensate upwardly through the casing annulus, where the foaming effluent was collected in collection tanks. The extracted hydrocarbons (water and oil) were separated by means of conventional separation techniques. Production from the well was considerably enhanced.

EXAMPLE 7

Continuous Injection Treatment

From a 300 gallon POLY-CORR (trademark) tank, the composition solution was continuously injected at a rate of about 4–6 gallons per day into the casing annulus of a packerless completion oil well, oil production from which was hindered primarily by water and iron and salt deposits in the casing. The solution mixed and foamed with the water, iron and salt in the well casing, and the foaming effluent was continually produced with the oil from the well. The extracted hydrocarbons were separated from the water and dissolved iron and salt minerals by means of conventional separation techniques. Continuous injection of the solution into the well was continued until production from the well stabilized, at which point the quantity of injected solution was adjusted to enhance stable production.

EXAMPLE 8

Continuous Injection Treatment

From a 300 gallon POLY-CORR (trademark) tank, the solution was continually injected at a rate of about 4–6 gallons per day into spaghetti string tubing extending through the coiled tubing of a packered completion gas well. Gas production from the well had been hindered by water and iron and salt deposits, as well as oil condensate, in the well. The solution mixed and foamed with the water, iron, salt and condensate in the well casing, and the foaming effluent was continually produced with the gas from the well. The extracted hydrocarbons (water and oil) were separated by means of conventional separation techniques. Continuous injection of the solution into the well was continued until production from the well stabilized, at which point the quantity of the solution was adjusted as needed to enhance stable production.

EXAMPLE 9

Continuous Injection Treatment

From a 300 gallon POLY-CORR (trademark) tank, the composition solution with corrosion inhibitor was continuously injected at a rate of about 4–6 gallons per day into the casing annulus of a packerless completion well, production from which had been hindered primarily by water and iron and salt deposits in the casing. The solution with inhibitor mixed and foamed with the water, hydrocarbon, iron and salt in the well casing, and the foaming effluent was continually produced with the well production. Continuous injection of the solution into the well was continued until production from the well stabilized, at which point injection of the solution with corrosion inhibitor into the well was gradually adjusted in quantity as needed to enhance stable production. The corrosion inhibitor in the solution enhanced well resistance to corrosion.

EXAMPLE 10

Purge Treatment

The composition solution was used to purge formation water from a gas well in order to eliminate water and condensate coning in the well. Accordingly, the gas well was initially preflushed with about 15 barrels of the flush water, which was applied to the well directly into the casing annulus of the packerless completion well. About 30 gallons of the solution was applied to the casing annulus. The well was then "rocked" by repeatedly opening and closing the master valve of the well, and this caused the solution to foam and nix with the water and hydrocarbon in the annulus and in the formation, as well as with the salt, iron and condensate in the water. The flocculating and foaming composition drew the formation water from the formation through the hydrocarbon perforations in the casing, and the effluent foamed upwardly through the casing atmulus to the well surface, where the effluent was collected in tanks. Accordingly, the hydrocarbon formation and casing annulus were substantially freed of fluids, thereby eliminating fluid coning in the casing annulus during production from the well.

EXAMPLE 11

Purge Treatment (Sulfamic Acid)

The solution was used to purge formation fluids from a gas well in order to eliminate water and condensate coning in the well, and to remove a large quantity of calcium and other mineral deposits from the well. Accordingly, the gas well was initially preflushed with about 15 barrels of the flush water, which was applied to the well directly into the casing annulus of the packerless completion well. About 150 lbs. of sulfamic acid was "slip-streamed" into the casing annulus with the flush water, and about 30 gallons of the solution was "slip-streamed" into the casing annulus with the sulfamic acid. The master valve of the well was closed for about 48 hours to allow the liquid mixture to soak in the well. The well was then "rocked" by repeatedly opening and closing the master valve of the well, and this caused the solution to foam and mix with the water and hydrocarbon in the annulus and in the formation, as well as with the salt, iron and oil condensate in the water. The flocculating and foaming composition solution drew the formation water from the formation through the perforations in the casing, and the effluent foamed upwardly through the casing annulus to the well surface, where the effluent was collected in tanks. Accordingly, the formation and casing annulus were substantially freed of water, thereby eliminating fluid coning in the casing annulus during production from the well, and the calcium and mineral deposits in the well bore were dissolved and removed from the well. Production was considerably enhanced.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A well stimulation and purging composition for cleaning, stimulating and purging an oil or gas well, comprising a substantially homogenous solution including water, a selected quantity of coco, diamine amido benzyl chloride quaternary compound dissolved in said water, a selected quantity of phosphate ester dissolved in said water and a selected quantity of isopropanol anhydrous dissolved in said water.

2. The well stimulation and purging composition of claim 1 comprising a selected quantity of potassium chloride dissolved in said water.

3. The well stimulation and purging composition of claim 1 comprising a selected quantity of ammonium bisulfide dissolved in said water.

4. The well stimulation and purging composition of claim 3 comprising a selected quantity of potassium chloride dissolved in said water.

5. The well stimulation and purging composition of claim 1 comprising a clay stabilizer formulation mixed in said water.

6. The well stimulation and purging composition of claim 5 comprising a selected quantity of ammonium bisulfide dissolved in said water.

* * * * *